United States Patent
Saito et al.

(10) Patent No.: US 11,648,916 B2
(45) Date of Patent: May 16, 2023

(54) ACTUATOR AND ACTUATOR DEVICE

(71) Applicant: NIDEC TOSOK CORPORATION, Kanagawa (JP)

(72) Inventors: Kazuhiro Saito, Kanagawa (JP); Seiji Hashimoto, Kanagawa (JP); Agato Ueno, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 520 days.

(21) Appl. No.: 16/792,287

(22) Filed: Feb. 16, 2020

(65) Prior Publication Data
US 2020/0307527 A1     Oct. 1, 2020

(30) Foreign Application Priority Data

Mar. 29, 2019     (JP) .............................. JP2019-065274

(51) Int. Cl.
| | | |
|---|---|---|
| *F16D 63/00* | (2006.01) | |
| *B60T 1/06* | (2006.01) | |
| *H02K 11/27* | (2016.01) | |
| *H02K 11/21* | (2016.01) | |
| *F16H 63/34* | (2006.01) | |

(52) U.S. Cl.
CPC ............ *B60T 1/06* (2013.01); *F16H 63/3416* (2013.01); *H02K 11/21* (2016.01); *H02K 11/27* (2016.01)

(58) Field of Classification Search
CPC .......... B60T 1/06; B60T 1/005; F16D 63/006; F16D 2127/06; F16H 63/38; F16H 63/3416; F16H 63/3458; F16H 63/3466; H02K 11/21; H02K 11/27
See application file for complete search history.

(56) References Cited

U.S. PATENT DOCUMENTS

| | | | |
|---|---|---|---|
| 7,926,382 B2* | 4/2011 | Mochizuki | F16H 59/10 74/473.36 |
| 2014/0028231 A1* | 1/2014 | Yoshida | F16H 61/32 318/400.42 |

(Continued)

FOREIGN PATENT DOCUMENTS

| | | | |
|---|---|---|---|
| JP | 2017052321 | 3/2017 | |
| JP | 2017101733 A | * 6/2017 | ............ F16H 59/105 |

OTHER PUBLICATIONS

Machine translation of JP 2017101733 (no date).*

*Primary Examiner* — Nicholas J Lane
(74) *Attorney, Agent, or Firm* — JCIPRNET

(57) ABSTRACT

An actuator includes a control part, a first rotation sensor, and a second rotation sensor able to detect rotation of an output shaft. The control part performs a first rotation angle acquisition control for acquiring a target rotation angle of the output shaft when a movable part is moved from the second position to the first position as a first rotation angle. The first rotation angle is a rotation angle of the output shaft that is closer to the second position side than when the movable part abuts the first wall part. In the first rotation angle acquisition control, the control part causes the movable part abuts the first wall part, acquires a rotation angle of the output shaft when the movable part has abutted the first wall part, and calculates the first rotation angle based on the rotation angle of the output shaft that has been acquired.

10 Claims, 7 Drawing Sheets

(56) References Cited

U.S. PATENT DOCUMENTS

2016/0053885 A1\* 2/2016 Noto .................. F16H 61/0202
74/473.12
2021/0180685 A1\* 6/2021 Cho ....................... F16H 59/70
2022/0271701 A1\* 8/2022 Yamada ............... H02P 29/032

\* cited by examiner

ACTUATOR AND ACTUATOR DEVICE

CROSS-REFERENCE TO RELATED APPLICATION

This application claims the priority benefit of Japan Application No. 2019-065274, filed on Mar. 29, 2019. The entirety of the above-mentioned patent application is hereby incorporated by reference herein and made a part of this specification.

FIELD OF THE INVENTION

The disclosure relates to an actuator and an actuator device.

BACKGROUND

An actuator that displaces and drives an object based on a vehicle operation is known. Examples of the object include a parking lock device that switches the vehicle gear to parking, a shift-by-wire driving device that performs or assists the switching of the vehicle gear based on a shift operation, and the like. For example, some conventional art describes, as an object that is displaced and driven by an actuator, a parking lock device that includes a parking rod, a cam that is externally mounted on the parking rod, and a parking lock ball that can engage with a parking gear.

In the actuator as described above, the accuracy of displacing the object may not be sufficiently improved due to, for example, the assembly tolerance of the object, the size tolerance of each part, and the like.

SUMMARY

An aspect of an actuator of the disclosure is an actuator which displaces and drives an object based on a vehicle operation, including a motor part; a decelerator part which is connected to the motor part; a control part which controls the motor part; a first rotation sensor which is able to detect rotation of the motor part; and a second rotation sensor which is able to detect rotation of an output shaft connected to the decelerator part. The object includes a movable part which is moved between a first position and a second position by the output shaft, and a first wall part which is able to abut the movable part being at the first position. The control part performs a first rotation angle acquisition control for acquiring a target rotation angle of the output shaft when the movable part is moved from the second position to the first position as a first rotation angle. The first rotation angle is a rotation angle of the output shaft that is closer to the second position side than when the movable part abuts the first wall part. In the first rotation angle acquisition control, the control part causes the output shaft to rotate so that the movable part abuts the first wall part, acquires a rotation angle of the output shaft when the movable part has abutted the first wall part based on a detection result of the second rotation sensor, and calculates the first rotation angle based on the rotation angle of the output shaft that has been acquired.

An aspect of an actuator device of the disclosure includes the above actuator, the output shaft, and the object.

The above and other elements, features, steps, characteristics and advantages of the present disclosure will become more apparent from the following detailed description of the preferred embodiments with reference to the attached drawings.

DESCRIPTION OF THE EMBODIMENTS

In the following embodiments, a case will be described as an example in which an object to be displaced and driven by an actuator 10 based on a vehicle operation is a parking switching mechanism 70 that is switched based on a shift operation of a vehicle. Further, a driving device 1 will be described as a machine on which the actuator 10 and the parking switching mechanism 70 of the embodiment are mounted.

Figure 1:
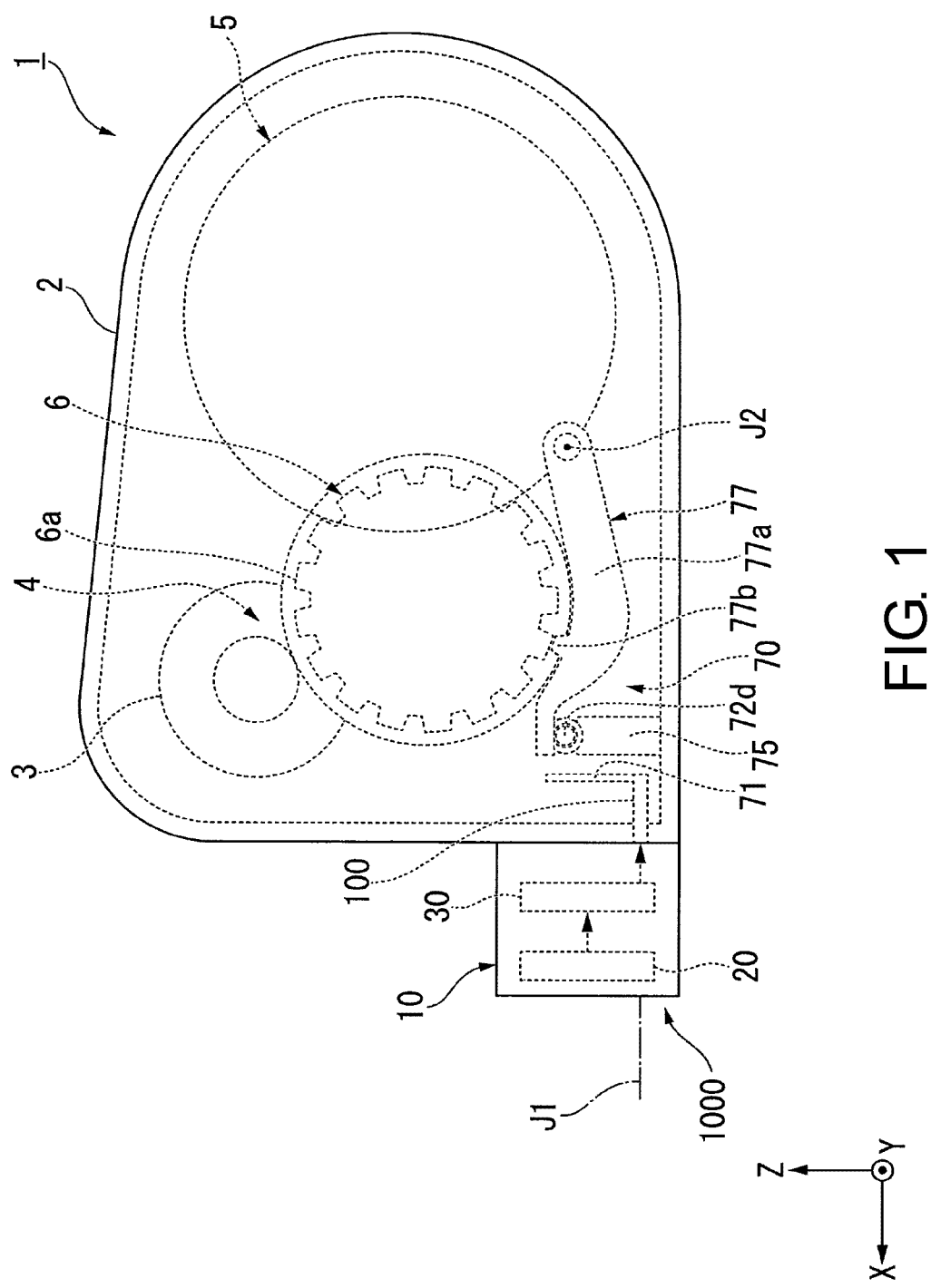
FIG. 1 is a view of a driving device of the embodiment as viewed from one side in a left-right direction of a vehicle.

In the following description, a vertical direction is defined and described based on the positional relationship when the driving device 1 of the embodiment shown in FIG. 1 is mounted on a vehicle located on a horizontal road surface. Further, in the drawings, an XYZ coordinate system is appropriately shown as a three-dimensional orthogonal coordinate system. In the XYZ coordinate system, a Z-axis direction is the vertical direction in which the +Z side is the upper side and the −Z side is the lower side. The X-axis direction is a direction orthogonal to the Z-axis direction and is a front-rear direction of the vehicle on which the driving device 1 is mounted. In the embodiment, the +X side is one front-rear-direction side of the vehicle, and the −X side is the other front-rear-direction side of the vehicle. The Y-axis direction is a direction orthogonal to both the X-axis direction and the Z-axis direction, and is a left-right direction of the vehicle. In the embodiment, the +Y side is one left-right-direction side of the vehicle, and the −Y side is the other left-right-direction side of the vehicle.

In the embodiment, a direction parallel to the Z-axis direction is referred to as "the vertical direction Z," and a direction parallel to the X-axis direction is referred to as "the front-rear direction X," and a direction parallel to the Y-axis direction is referred to as "the left-right direction Y." Further, the positive side in the Z-axis direction (the +Z side) is referred to as "the upper side," and the negative side in the Z-axis direction (the −Z side) is referred to as "the lower side." The positive side in the X-axis direction (the +X side) is referred to as "the one front-rear-direction side," and the negative side in the X-axis direction (the −X side) is referred to as "the other front-rear-direction side." The positive side in the Y-axis direction (the +Y side) is referred to as "the one left-right-direction side," and the negative side in the Y-axis direction (the −Y side) is referred to as "the other left-right-direction side."

The driving device 1 of the embodiment is mounted on a vehicle using a motor as a power source, such as a hybrid electric vehicle (HEV), a plug-in hybrid vehicle (PHV), and an electric vehicle (EV), and the driving device 1 is used as the power source thereof. As shown in FIG. 1, the driving device 1 includes a housing 2, a motor 3, a deceleration device 4, a differential device 5, a park lock gear 6, and an actuator device 1000. The actuator device 1000 includes the parking switching mechanism 70, the actuator 10, and an output shaft 100.

The output shaft 100 is connected to the actuator 10 and is rotated by the actuator 10. In the embodiment, the output shaft 100 extends in the front-rear direction X with a central axis J1 as the center. In the following description, unless otherwise specified, a radial direction with the central axis J1 as the center is simply referred to as "the radial direction," and a circumferential direction with the central axis J1 as the center (that is, around the central axis J1) is simply referred to as "the circumferential direction." The end part of the output shaft 100 on the one front-rear-direction side (the +X side) is a connected part 101 connected to the actuator 10. The connected part 101 is provided with a plurality of spline grooves extending in the front-rear direction X along the circumferential direction.

The housing 2 accommodates the motor 3, the deceleration device 4, the differential device 5, and the parking switching mechanism 70 in its inner part. Though omitted in the drawings, oil is accommodated in the inner part of the housing 2. The deceleration device 4 is connected to the motor 3. The differential device 5 is connected to the deceleration device 4 and transmits torque output from the motor 3 to an axle of the vehicle. The park lock gear 6 is fixed to a gear provided in the deceleration device 4. The park lock gear 6 is connected to the axle of the vehicle via the deceleration device 4 and the differential device 5. The park lock gear 6 includes a plurality of teeth parts 6a.

Figure 2:
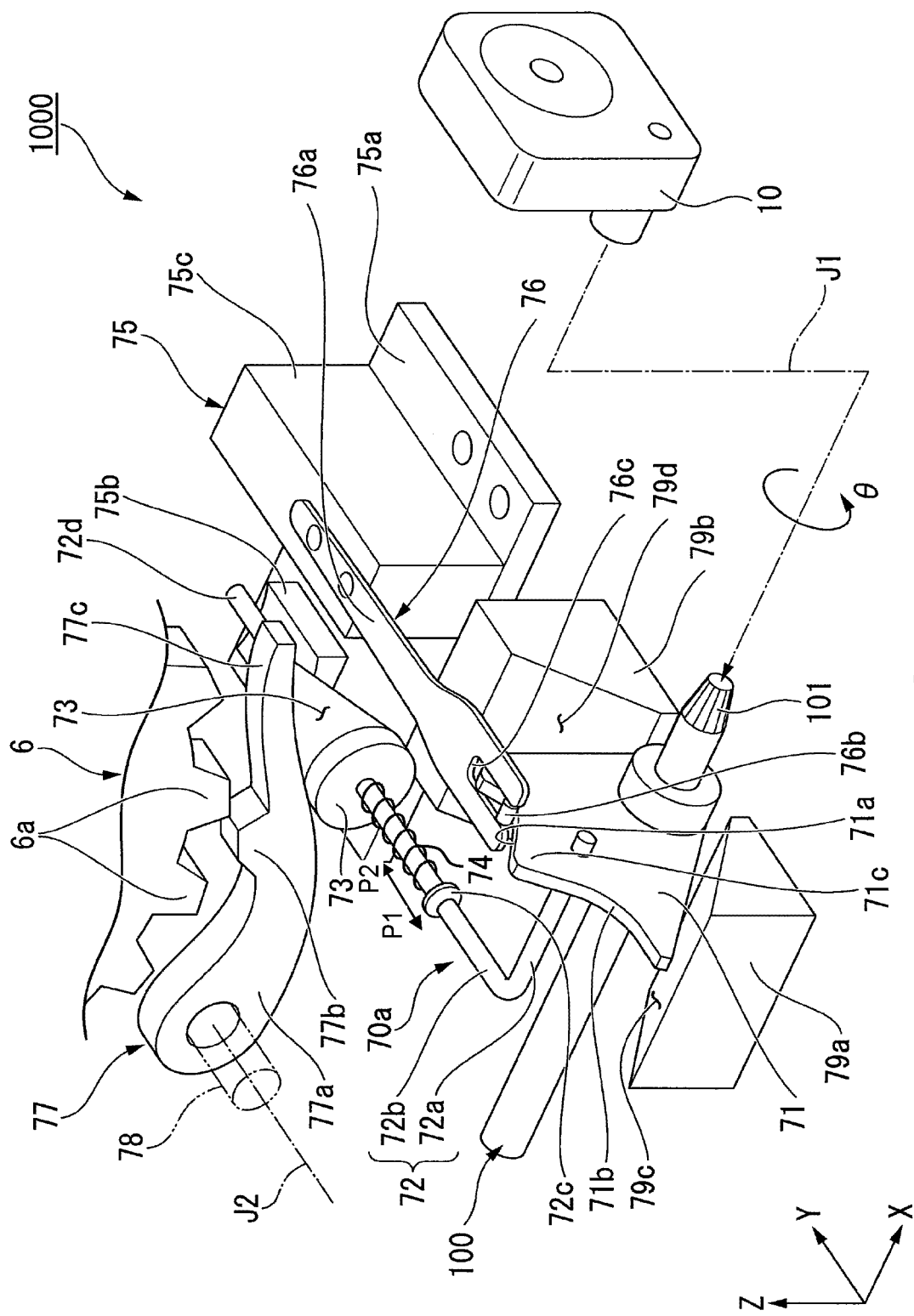
FIG. 2 is a perspective view showing an actuator device of the embodiment.

The parking switching mechanism 70 is driven by the actuator 10 based on a shift operation of the vehicle. The parking switching mechanism 70 switches the park lock gear 6 between a locked state and an unlocked state. The parking switching mechanism 70 sets the park lock gear 6 in the locked state when the vehicle gear is in park, and sets the park lock gear 6 in the unlocked state when the vehicle gear is not in park. The case where the vehicle gear is not in park includes, for example, the case where the vehicle gear is in drive, neutral, reverse, or the like. As shown in FIG. 2, the parking switching mechanism 70 includes a movable part 70a, a park lock arm 77, a supporting member 75, a leaf spring member 76, a non-parking position wall part 79a, and a parking position wall part 79b. Further, in the embodiment, the non-parking position wall part 79a corresponds to a first wall part, and the parking position wall part 79b corresponds to a second wall part.

The movable part 70a moves along the left-right direction Y based on the shift operation of the vehicle. That is, in the embodiment, the left-right direction Y corresponds to a moving direction in which the movable part 70a moves. In addition, the vertical direction Z corresponds to an intersection direction that intersects the moving direction in which the movable part 70a moves, and the lower side corresponds to one intersection-direction side. In the embodiment, the movable part 70a is moved by the actuator 10 via the output shaft 100. The position of the movable part 70a in the left-right direction Y is switched at least between a non-parking position P1 and a parking position P2. That is, the movable part 70a is moved between the non-parking position P1 and the parking position P2 by the output shaft 100. The non-parking position P1 is a position of the movable part 70a in the left-right direction Y when the vehicle gear is not in park. The parking position P2 is a position of the movable part 70a in the left-right direction Y when the vehicle gear is in park. The parking position P2 is a position closer to the one left-right-direction side (the +Y side) than the non-parking position P1. FIG. 2 shows the case where the movable part 70a is located at the non-parking position P1. Here, the meaning of the case where the movable part 70a is located at the non-parking position P1 is that the movable portion 70a is in a non-parking state and the entire components of the movable part 70a (such as a detent plate 71, a rod 72, an annular member 73, and a coil spring 74 described later) is located at their positions of the non-parking state. Further, in the embodiment, the non-parking position P1 corresponds to a first position, and the parking position P2 corresponds to a second position. Similarly, when the movable part 70a is located at the parking position P2, it means that the movable part 70a is in a parking state, and the entire components of the movable part 70a is located at their positions of the parking state.

The movable part 70a includes a detent plate 71, a rod 72, an annular member 73, and a coil spring 74. The detent plate 71 is fixed to the output shaft 100. The detent plate 71 is moved by the output shaft 100. The detent plate 71 extends from the output shaft 100 toward the radial-direction outer side. In the embodiment, the detent plate 71 extends from the output shaft 100 toward the upper side. In the embodiment, the detent plate 71 is in a plate shape whose plate surface faces the front-rear direction X. The width of the detent plate 71 increases from the output shaft 100 toward the radial-direction outer side. The detent plate 71 includes a first concave part 71a and a second concave part 71b.

The first concave part 71a and the second concave part 71b are provided on the radial-direction outer end part of the detent plate 71. The first concave part 71a and the second concave part 71b are recessed from the upper-side end part of the detent plate 71 toward the lower side. The first concave part 71a and the second concave part 71b penetrate the detent plate 71 in the front-rear direction X. The first concave part 71a and the second concave part 71b are disposed side by side in the circumferential direction. In the embodiment, the first concave part 71a and the second concave part 71b are disposed side by side in the left-right direction Y. The second concave part 71b is located on the other left-right-direction side (the −Y side) of the first concave part 71a. By providing the first concave part 71a and the second concave part 71b, a convex part 71c protruding toward the radial-direction outer side is provided in a circumferential-direction part between the first concave part 71a and the second concave part 71b of the detent plate 71.

The rod 72 is disposed to be movable along the left-right direction Y. The rod 72 includes a connecting part 72a and a rod body 72b. The connecting part 72a is in a rod shape extending in the front-rear direction X. The end part of the connection part 72a on the one front-rear-direction side (the +X side) penetrates the detent plate 71 in the front-rear direction X and is fixed to the detent plate 71. In this way, the rod 72 is connected to the output shaft 100 via the detent plate 71. The rod body 72b is in a rod shape extending in the left-right direction Y. In the embodiment, the rod body 72b extends from the end part of the connecting part 72a on the other front-rear-direction side (the −X side) toward the one left-right-direction side (the +Y side). The rod body 72b includes a protruding part 72c at a part near the connecting part 72a. There is a cylindrical member 72d extending in the left-right direction Y fitted and fixed to the end part of the rod body 72b on the one left-right-direction side.

The annular member 73 is in an annular shape through which the rod body 72b is passed. The annular member 73 extends in the left-right direction Y. The part on the one left-right-direction side (the +Y side) of the outer circumferential surface of the annular member 73 is a tapered surface 73a whose outer diameter decreases toward the one left-right-direction side. The annular member 73 is movable in the left-right direction Y with respect to the rod body 72b.

The coil spring 74 extends in the left-right direction Y. The coil spring 74 is disposed between the annular member 73 and the protruding part 72c in the left-right direction Y. The rod body 72b is passed through the coil spring 74. The end part of the coil spring 74 on the other left-right-direction side (the −Y side) contacts the protruding part 72c. The end part of the coil spring 74 on the one left-right-direction side (the +Y side) contacts the surface of the annular member 73 on the other left-right-direction side. The coil spring 74 expands and contracts through the annular member 73 moving relative to the rod body 72b in the left-right direction Y, and applies an elastic force in the left-right direction Y to the annular member 73.

The park lock arm 77 is located on the other front-rear-direction side (the −X side) of the movable part 70a. The park lock arm 77 is rotatably supported by a supporting shaft 78 with a rotation axis J2 extending in the left-right direction Y as the center. The park lock arm 77 includes a park lock arm body 77a and an engaging part 77b.

The park lock arm body 77a extends from the supporting shaft 78 toward the one front-rear-direction side (the +X side). An end part 77c of the park lock arm body 77a on the one front-rear-direction side contacts the movable part 70a from the upper side. The engaging part 77b protrudes from the park lock arm body 77a toward the upper side. A winding spring (not shown) is attached to the supporting shaft 78. The winding spring (not shown) applies to the park lock arm 77 an elastic force in the clockwise direction as viewed from the other left-right-direction side (the −Y side) with the rotation axis J2 as the center.

The park lock arm 77 moves as the movable part 70a moves. More specifically, the park lock arm 77 rotates around the rotation axis J2 as the rod 72 and the annular member 73 move in the left-right direction Y. When the detent plate 71 moves from its position of the non-parking state to its position of the parking state as the output shaft 100 rotates, the rod 72 and the annular member 73 move to the one left-right-direction side (the +Y side).

The outer diameter of the tapered surface 73a of the annular member 73 increases from the one left-right-direction side (the +Y side) toward the other left-right-direction side (the −Y side). Therefore, when the annular member 73 moves to the one left-right-direction side, the end part 77c is lifted to the upper side by the tapered surface 73a, and the park lock arm 77 rotates counterclockwise as viewed from the other left-right-direction side (the −Y side) with the rotation axis J2 as the center. In this way, though omitted in the drawings, the engaging part 77b approaches the park lock gear 6, and engages between the teeth parts 6a of the park lock gear 6.

In the case where the park lock gear 6 and the park lock arm 77 engage with each other, the annular member 73 is in the parking state, and the entire movable part 70a is in the parking state of being located at the parking position P2. That is, the park lock arm 77 engages with the park lock gear 6 connected to the axle when the movable part 70a is located at the parking position P2. The annular member 73 when being at its position of the parking state is sandwiched between and in contact with a contact part 75b (to be described later) of the supporting member 75 and the park lock arm 77. Through the park lock arm 77 engaging with the park lock gear 6, the park lock gear 6 is in the locked state.

When the park lock arm 77 approaches the park lock gear 6, depending on the position of the teeth parts 6a of the park lock gear 6, the engaging part 77b may contact the teeth parts 6a. In this case, the park lock arm 77 may not be able to move to a position where the engaging part 77b engages between the teeth parts 6a. Even in such a case, in the embodiment, since the annular member 73 can move with respect to the rod 72 in the left-right direction Y, a state can be allowed in which the annular member 73 is located closer to the other left-right-direction side (the −Y side) than when being at its position of the parking state while the rod 72 moves to its position of the parking state. In this way, the rotation of the output shaft 100 can be suppressed from being obstructed, and a load can be suppressed from being applied to the actuator 10 that causes the output shaft 100 to rotate.

Further, in a state where the rod 72 is located at its position of the parking state and the annular member 73 is located closer to the other left-right-direction side (the −Y side) than when being at its position of the parking state, the coil spring 74 is compressed and deformed. Therefore, an elastic force in the direction toward the one left-right-direction side (the direction toward the +Y side) is applied to the annular member 73 by the coil spring 74. As a result, a rotational moment in a direction that rotates counterclockwise as viewed from the other left-right-direction side (the −Y side) with the rotation axis J2 as the center is applied from the coil spring 74 to the park lock arm 77 via the annular member 73. Therefore, when the park lock gear 6 rotates and the position of the teeth parts 6a is shifted, the park lock arm 77 rotates, and the engaging part 77b engages between the teeth parts 6a.

When the detent plate 71 rotates from its position of the parking state to its position of the non-parking state as the output shaft 100 rotates, the rod 72 and the annular member 73 move to the other left-right-direction side (the −Y side). When the annular member 73 moves to the other left-right-direction side, the end part 77c that has been lifted by the annular member 73 moves to the lower side due to its own weight and an elastic force received from the winding spring (not shown), and the park lock arm 77 rotates counterclockwise as viewed from the one left-right-direction side (the +Y side) with the rotation axis J2 as the center. In this way, the engaging part 77b is separated from the park lock gear 6, and disengages from between the teeth parts 6a. FIG. 2 shows the park lock arm 77 in a state of disengaging from the park lock gear 6.

In the case where the park lock gear 77 and the park lock arm 6 disengage from each other, the annular member 73 is located at its position of the non-parking state, and the entire movable part 70a is located at the non-parking position P1. That is, the park lock arm 77 disengages from the park lock gear 6 when the movable part 70a is located at the non-parking position P1. The annular member 73 at its position of the non-parking state is located closer to the other left-right-direction side (the −Y side) than the park lock arm 77. Through the park lock arm 77 disengaging from the park lock gear 6, the park lock gear 6 is in the unlocked state.

The supporting member 75 supports the movable part 70a to be movable in the left-right direction Y. In the embodiment, the supporting member 75 supports the movable part 70a from the lower side. The supporting member 75 is fixed to the inner side surface of the housing 2. The supporting member 75 includes a base part 75a, the contact part 75b, and a leaf spring fixing part 75c.

In the embodiment, the base part 75a is in a plate shape whose plate surface faces the vertical direction Z. The contact part 75b protrudes from the base part 75a toward the upper side. The contact part 75b is a part that contacts the movable part 70a and supports the movable part 70a. In the embodiment, the contact part 75b contacts the annular member 73 of the movable part 70a from the lower side, and supports the movable part 70a from the lower side. The surface of the contact part 75b on the movable part 70a side is a curved surface in an arc shape that is concave on the opposite side of the movable part 70a side when viewed along the left-right direction Y. Therefore, the annular member 73 having the tapered surface 73a can be stably supported. In the embodiment, the curved surface of the contact part 75b is the upper side surface of the contact part 75b, and is in an arc shape that is concave toward the lower side when viewed along the left-right direction Y.

The leaf spring fixing part 75c protrudes from the base part 75a toward the upper side. The leaf spring fixing part 75c is, for example, in a rectangular parallelepiped shape. The leaf spring fixing part 75c is located closer to the one front-rear-direction side (the +X side) than the contact part 75b.

The leaf spring member 76 is fixed to the leaf spring fixing part 75c of the supporting member 75. In the embodiment, the leaf spring member 76 is fixed to the end part on the other left-right-direction side (the −Y side) of the upper side surface of the leaf spring fixing part 75c. The leaf spring member 76 includes a leaf spring body part 76a and an inserted part 76b.

The leaf spring body part 76a is in a plate shape whose plate surface faces the vertical direction Z. The leaf spring body part 76a extends from the leaf spring fixing part 75c toward the other left-right-direction side (the −Y side). The leaf spring body part 76a extends until the upper side of the detent plate 71. The leaf spring body part 76a includes a slit 76c in a part on the other left-right-direction side. The slit 76c penetrates the leaf spring body part 76a in the vertical direction Z. The slit 76c extends in the left-right direction Y. The slit 76c extends until the end part of the leaf spring body part 76a on the other left-right-direction side, and bifurcates the end part of the leaf spring body part 76a on the other left-right-direction side into two parts.

The inserted part 76b is provided at the end part of the leaf spring body part 76a on the other left-right-direction side (the −Y side). In the embodiment, the inserted part 76b is a roller that is attached to the leaf spring body part 76a to be rotatable around an axis extending in the front-rear direction X. The inserted part 76b is provided between the tip parts of the leaf spring body part 76a bifurcated by the slit 76c. The inserted part 76b is inserted into the first concave part 71a or the second concave part 71b. The inserted part 76b is inserted into the second concave part 71b and hooked with respect to an inner side surface of the second concave part 71b in the left-right direction Y when the movable part 70a is located at the parking position P2. In this way, the detent plate 71 and the rod 72 can be maintained at their positions of the parking state.

Specifically, in the case where the coil spring 74 is provided as in the embodiment, the reaction force caused by the elastic force generated when the engaging part 77b contacts the teeth parts 6a and the coil spring 74 is compressed and deformed is applied to the rod 72 and the detent plate 71 in the direction toward the other left-right-direction side (the direction toward the −Y side). According to the embodiment, even in such a case, the detent plate 71 can be suppressed from moving to the other left-right-direction side (the −Y side) by the inserted part 76b being hooked in the second concave part 71b. Therefore, the detent plate 71 and the rod 72 can be stably maintained at their positions of the parking state.

In addition, when the output shaft 100 is rotated by the actuator 10 and the detent plate 71 moves from its positions of the parking state to its positions of the non-parking state, the leaf spring body part 76a is pushed toward the upper side by the convex part 71c of the detent plate 71 and elastically deforms. As a result, the inserted part 76b is detached from the second concave part 71b. The inserted part 76b is inserted into the first concave part 71a and hooked with respect to an inner side surface of the first concave part 71a in the left-right direction Y when the movable part 70a is located at the non-parking position P1. In this way, the detent plate 71 and the rod 72 can be maintained at their positions of the non-parking state.

In the embodiment, when the inserted part 76b moves between the first concave part 71a and the second concave part 71b, the inserted part 76b moves over the convex part 71c from the inner part of one concave part and relatively moves to the other concave part. When the inserted part 76b moves over the convex part 71c, the leaf spring member 76 receives an upward force from the convex part 71c via the inserted part 76b and elastically deforms. That is, in the embodiment, the leaf spring member 76 is an elastic member that elastically deforms by being pushed by the convex part 71c when the movable part 70a moves between the non-parking position P1 and the parking position P2. In the embodiment, when the inserted part 76b moves between the first concave part 71a and the second concave part 71b, the inserted part 76b, which is a roller, moves while rolling on the upper-side end surface of the detent plate 71.

The non-parking position wall part 79a is located on the other left-right-direction side (the −Y side) of the detent plate 71. The non-parking position wall part 79a includes a wall surface 79c that faces the detent plate 71. The wall surface 79c faces the one left-right-direction side (the +Y side) and the upper side. The wall surface 79c is an inclined surface located on the other left-right-direction side as it goes from the lower side to the upper side. In the embodiment, at the non-parking state, the wall surface 79c contacts the end part on the other left-right-direction side of the upper-side end part of the detent plate 71. The non-parking position wall part 79a is a wall part that can abut the movable part 70a being at the non-parking position P1.

The parking position wall part 79b is located on the one left-right-direction side (the +Y side) of the detent plate 71. The parking position wall part 79b includes a wall surface 79d that faces the detent plate 71. The wall surface 79d faces the other left-right-direction side (the −Y side) and the upper side. The wall surface 79d is an inclined surface located on the one left-right-direction side as it goes from the lower side to the upper side. In the embodiment, at the parking state, the wall surface 79d contacts the end part on the one left-right-direction side of the upper-side end part of the detent plate 71. The parking position wall part 79b is a wall part that can abut the movable part 70a being at the parking position P2.

The actuator 10 drives the parking switching mechanism 70 based on the shift operation of the vehicle. In the embodiment, the actuator 10 drives the parking switching mechanism 70 by causing the movable part 70a to move in the left-right direction Y via the output shaft 100, and switches the park lock gear 6 between the locked state and the unlocked state.

Figure 3:
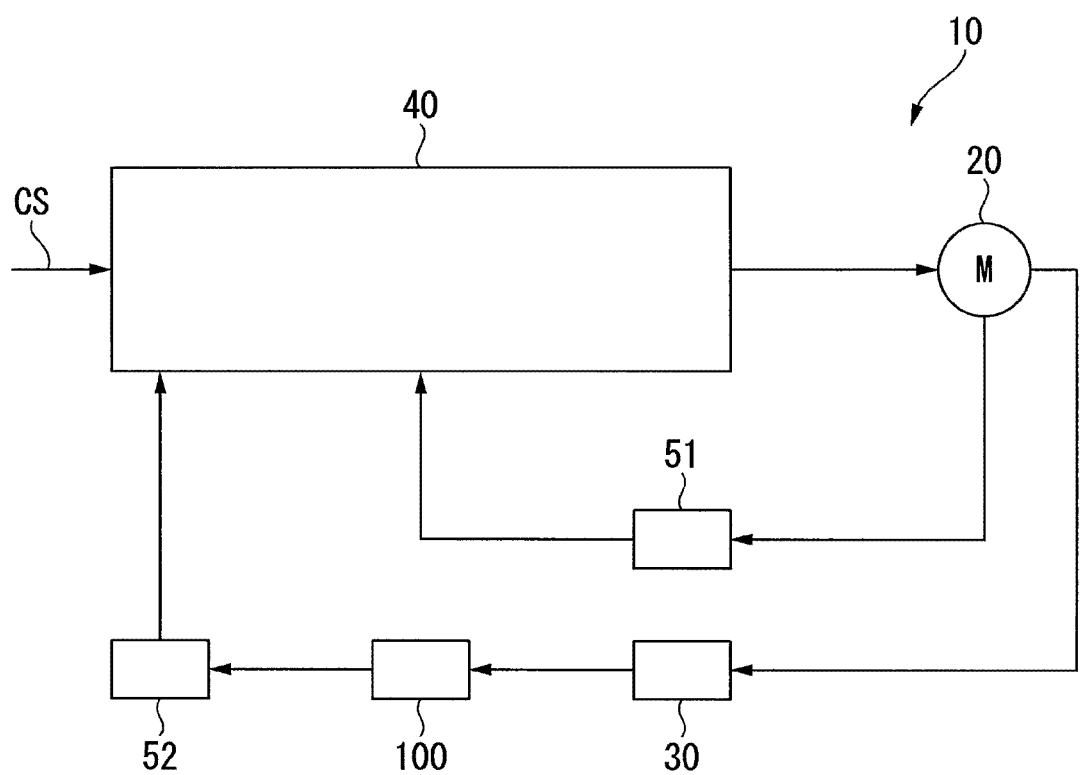
FIG. 3 is a block diagram showing a functional configuration of the actuator of the embodiment.

As shown in FIG. 3, the actuator 10 includes a motor part 20, a decelerator part 30, a first rotation sensor 51, a second rotation sensor 52, and a control part 40. The decelerator part 30 is connected to the motor part 20. The decelerator part 30 decelerates the rotation of the motor part 20. The output shaft 100 is connected to the decelerator part 30. The rotation of the motor part 20 decelerated by the decelerator part 30 is transmitted to the output shaft 100.

The first rotation sensor 51 is a sensor that can detect the rotation of the motor part 20. The first rotation sensor 51 is, for example, a magnetic sensor such as a Hall element (like a Hall IC) and a magnetoresistive element. The first rotation sensor 51, being a magnetic sensor, can detect the rotation of the rotor (that is, the rotation of the motor part 20) by, for example, detecting the magnetic field of a sensor magnet attached to the rotor of the motor part 20. The detection result of the first rotation sensor 51 is output to the control part 40.

The second rotation sensor 52 is a sensor that can detect the rotation of the output shaft 100 connected to the decelerator part 30. The second rotation sensor 52 is, for example, a magnetic sensor such as a Hall element (like a Hall IC) and a magnetoresistive element. The second rotation sensor 52, being a magnetic sensor, can detect the rotation of the output shaft 100 by, for example, detecting the magnetic field of a sensor magnet attached to the output shaft 100. The sensor magnet whose magnetic field is detected by the second rotation sensor 52 is provided at the output part of the decelerator part 30, and is attached to the output shaft 100 by connecting the output shaft 100 to the output part of the decelerator part 30. The detection result of the second rotation sensor 52 is output to the control part 40.

The control part 40 controls the motor part 20. A movement command CS is input to the control part 40. The movement command CS is a signal sent to the actuator 10 when the shift operation of the vehicle is performed. The movement command CS is, for example, sent from an engine control unit of the vehicle. The movement command CS includes information on switching the vehicle gear to any gear. The control part 40 causes the motor part 20 to rotate based on the movement command CS.

The control part 40 performs a rotation angle learning control for acquiring a target rotation angle of the output shaft 100 when the movable part 70a is moved to switch the parking switching mechanism 70. In the embodiment, the control part 40 performs the rotation angle learning control before the switching control of the parking switching mechanism 70 based on the shift operation is performed for the first time. In the embodiment, a case will be described in which the movable part 70a is located at the parking position P2 at the timing when the rotation angle learning control is started. In the embodiment, the control part 40 performs the rotation angle learning control according to the procedure of steps S11 to S15 shown in FIG. 4.

Figure 5:
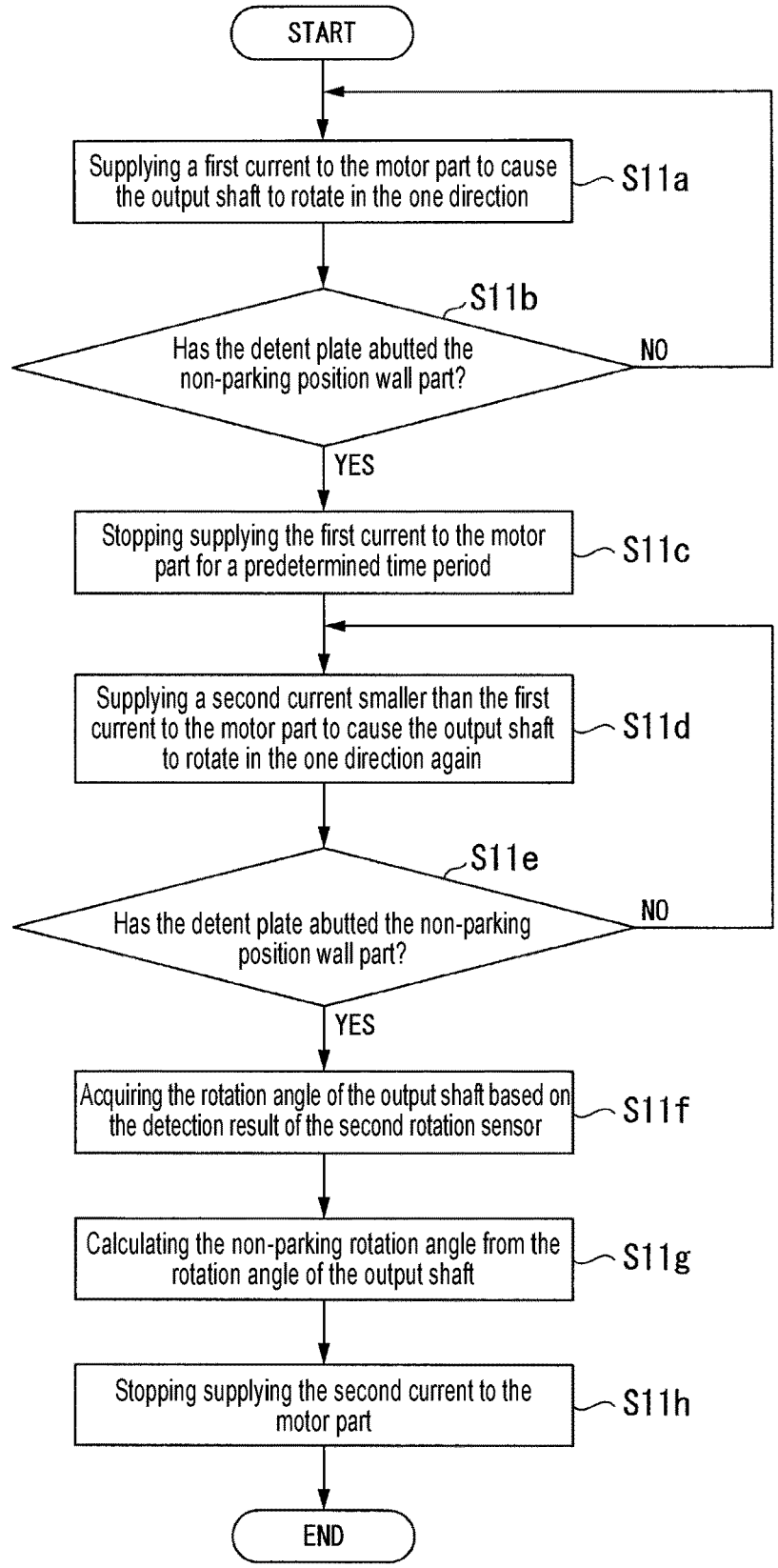
FIG. 5 is a flowchart showing an example of a procedure of a non-parking rotation angle acquisition control of the embodiment.

In step S11, the control part 40 performs a non-parking rotation angle acquisition control for acquiring a target rotation angle of the output shaft 100 when the movable part 70a is moved from the parking position P2 to the non-parking position P1 as a non-parking rotation angle. In the non-parking rotation angle acquisition control of the embodiment, the control part 40 executes the procedure of steps S11a to S11h shown in FIG. 5. Further, in the embodiment, the non-parking rotation angle corresponds to a first rotation angle, and the non-parking rotation angle acquisition control corresponds to a first rotation angle acquisition control.

In step S11a, the control part 40 supplies a first current to the motor part 20 to cause the output shaft 100 to rotate in one direction. In the embodiment, the one direction is a direction that rotates counterclockwise as viewed from the one front-rear-direction side (the +X side) with the central axis J1 as the center, and is a direction pointed by an arrow θ showing a rotation angle of the output shaft 100 in FIG. 2. When the output shaft 100 rotates in the one direction, the detent plate 71 rotates counterclockwise as viewed from the one front-rear-direction side (the +X side) with the central axis J1 as the center, and the movable part 70a moves toward the other left-right-direction side (the −Y side).

In step S11b, the control part 40 determines whether or not the detent plate 71 has abutted the non-parking position wall part 79a. In the embodiment, the control part 40 determines whether or not the detent plate 71 has abutted the non-parking position wall part 79a based on the detection result of the second rotation sensor 52, for example. Specifically, the control part 40 determines that the detent plate 71 has abutted the non-parking position wall part 79a, for example, when the rotation angle of the output shaft 100 acquired based on the second rotation sensor 52 does not change or when the change of the rotation angle of the output shaft 100 suddenly decreases.

When determining that the detent plate 71 has not abutted the non-parking position wall part 79a, the control part 40 continues supplying the first current to the motor part 20 and continues causing the output shaft 100 to rotate in the one direction. On the other hand, when determining that the detent plate 71 has abutted the non-parking position wall part 79a, the control part 40 performs step S11c. In step S11c, the control part 40 stops supplying the first current to the motor part 20 for a predetermined time period. The predetermined time period is, for example, about several seconds.

Here, when the movable part 70a is moved from the parking position P2 to the non-parking position P1, the inserted part 76b of the leaf spring member 76 changes from a state of being inserted into the second concave part 71b provided in the detent plate 71 to a state of being inserted into the first concave part 71a provided in the detent plate 71. At this time, it is necessary for the movable part 70a to push up the leaf spring member 76 to make it elastically deform, and to make the inserted part 76b move over the convex part 71c provided between the first concave part 71a and the second concave part 71b. Therefore, it is necessary to increase the rotational torque applied from the output shaft 100 to the detent plate 71 to some extent, and it is necessary to relatively increase the value of the first current supplied to the motor part 20. Accordingly, the detent plate 71 is relatively strongly pushed against the non-parking position wall part 79a, and at least a part of the movable part 70a and the output shaft 100 elastically deforms. Specifically, for example, elastic torsional deformation occurs in the output shaft 100. In particular, since the connected part 101 of the output shaft 100 connected to the actuator 10 is provided with the plurality of spline grooves, the output shaft 100 is easily twisted in the connected part 101.

When the supply of the first current to the motor part 20 is stopped in step S11c in a state where the output shaft 100 and the like elastically deform in this way, the elastically deformed part recovers the deformation, and the movable part 70a moves only in a direction from the non-parking position P1 to the parking position P2 (the +Y direction and the −θ direction). As a result, the detent plate 71 is detached from the non-parking position wall part 79a. At this time, the inserted part 76b remains located in the inner part of the first concave part 71a.

In step S11d, the control part 40 supplies a second current smaller than the first current to the motor part 20 to cause the output shaft 100 to rotate in the one direction again. The value of the second current is small to the extent that the movable part 70a cannot sufficiently push up the leaf spring member 76 and the inserted part 76b cannot move over the convex part 71c provided between the first concave part 71a and the second concave part 71b. The value of the second current is a value that is small to the extent that the elastic deformation of at least a part of the movable part 70a and the output shaft 100 does not occur when the detent plate 71 has abutted the non-parking position wall part 79a.

The value of the second current is, for example, ½ or less of the value of the first current. More preferably, the value of the second current is, for example, ⅒ or less of the value of the first current. Even more preferably, the value of the second current is, for example, ¹⁄₂₀ or less of the value of the first current. For example, when the value of the first current is 10 A, the value of the second current is 0.5 A.

In step S11e, the control part 40 determines whether or not the detent plate 71 has abutted the non-parking position wall part 79a. Similar to step S11b described above, the control part 40 determines whether or not the detent plate 71 has abutted the non-parking position wall part 79a based on the detection result of the second rotation sensor 52. In addition, since in step S11c and subsequent time, the inserted part 76b has already moved over the convex part 71c and is in a state of being inserted into the first concave part 71a, when the detent plate 71 abuts the non-parking position wall part 79a, it is not necessary to make the inserted part 76b move over the convex part 71c. Therefore, it is not necessary to apply a relatively large rotational torque to the movable part 70a, and the detent plate 71 can abut the non-parking position wall part 79a even if the value of the second current is small to the extent described above.

When determining that the detent plate 71 has not abutted the non-parking position wall part 79a, the control part 40 continues supplying the second current to the motor part 20 and continues causing the output shaft 100 to rotate in the one direction. On the other hand, when determining that the detent plate 71 has abutted the non-parking position wall part 79a, the control part 40 performs step S11f.

In step S11f, the control part 40 acquires the rotation angle of the output shaft 100 when the detent plate 71 has abutted the non-parking position wall part 79a based on the detection result of the second rotation sensor 52. That is, in the non-parking rotation angle acquisition control, the control part 40 acquires the rotation angle of the output shaft 100 when the movable part 70a has abutted the non-parking position wall part 79a.

In step S11g, the control part 40 calculates the non-parking rotation angle from the rotation angle of the output shaft 100 acquired in step S11f. That is, in the non-parking rotation angle acquisition control, the control part 40 calculates the non-parking rotation angle based on the rotation angle of the output shaft 100 when the movable part 70a has abutted the non-parking position wall part 79a as the value of the current is reduced.

Specifically, the control part 40 calculates, as the non-parking rotation angle, a rotation angle that is closer to the other circumferential-direction side (the −θ side) than the rotation angle of the output shaft 100 acquired based on the detection result of the second rotation sensor 52 by a first predetermined angle. That is, the non-parking rotation angle is the rotation angle of the output shaft 100 that is closer to the parking position P2 side (the +Y side and the −θ side) than when the movable part 70a abuts the non-parking position wall part 79a.

The first predetermined angle is determined based on the estimated maximum error amount of the rotation angle of the output shaft 100 and the like. The first predetermined angle is, for example, a value acquired by multiplying the estimated maximum error amount of the rotation angle of the output shaft 100 by a safety factor. The first predetermined angle is, for example, in a range of about 1° or more to 3° or less.

By calculating the non-parking rotation angle in this way, when the output shaft 100 is rotated with the non-parking rotation angle as the target rotation angle, even when the output shaft 100 is rotated to a position most deviated within a range estimated with respect to the non-parking rotation angle, the detent plate 71 can be suppressed from colliding with the non-parking position wall part 79a. When the rotation angle of the output shaft 100 is the non-parking rotation angle, the movable part 70a is located at the non-parking position P1, and the park lock gear 6 is in the unlocked state.

In step S11h, the control part 40 stops supplying the second current to the motor part 20. Thus, the non-parking rotation angle acquisition control of step S11 ends, and the non-parking rotation angle is acquired.

Figure 4:
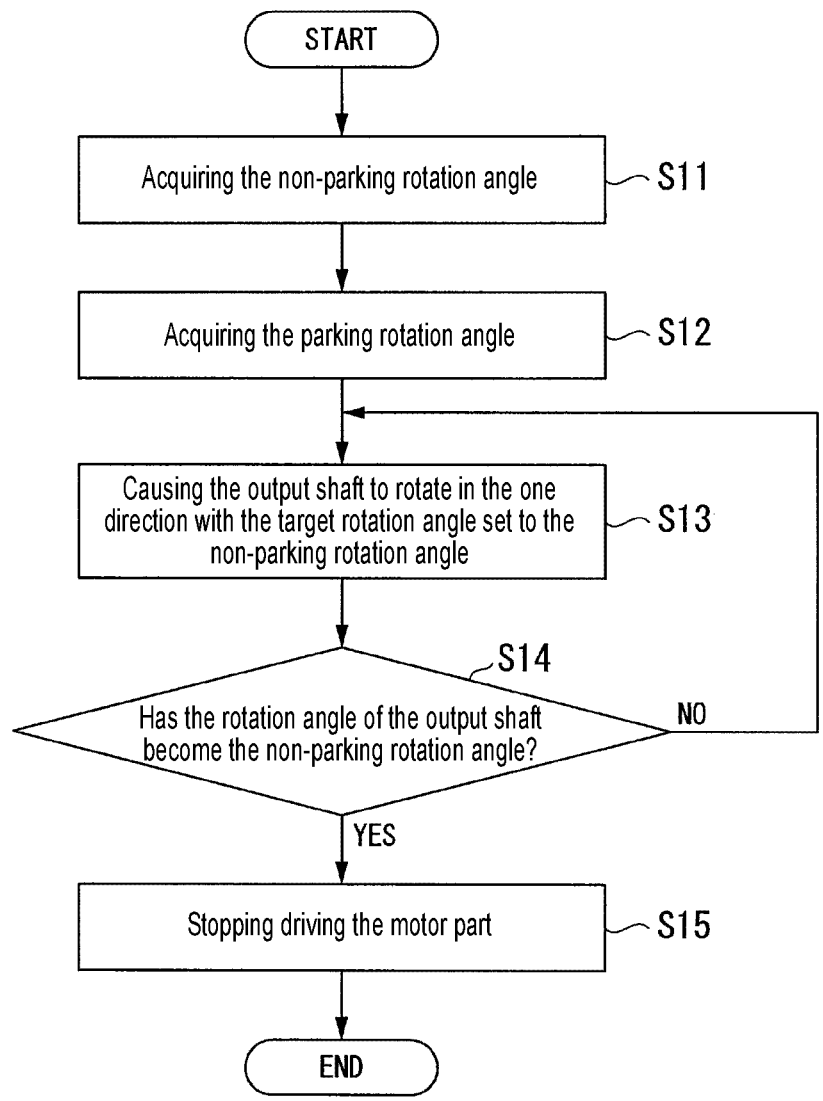
FIG. 4 is a flowchart showing an example of a procedure of a rotation angle learning control of the embodiment.
Figure 6:
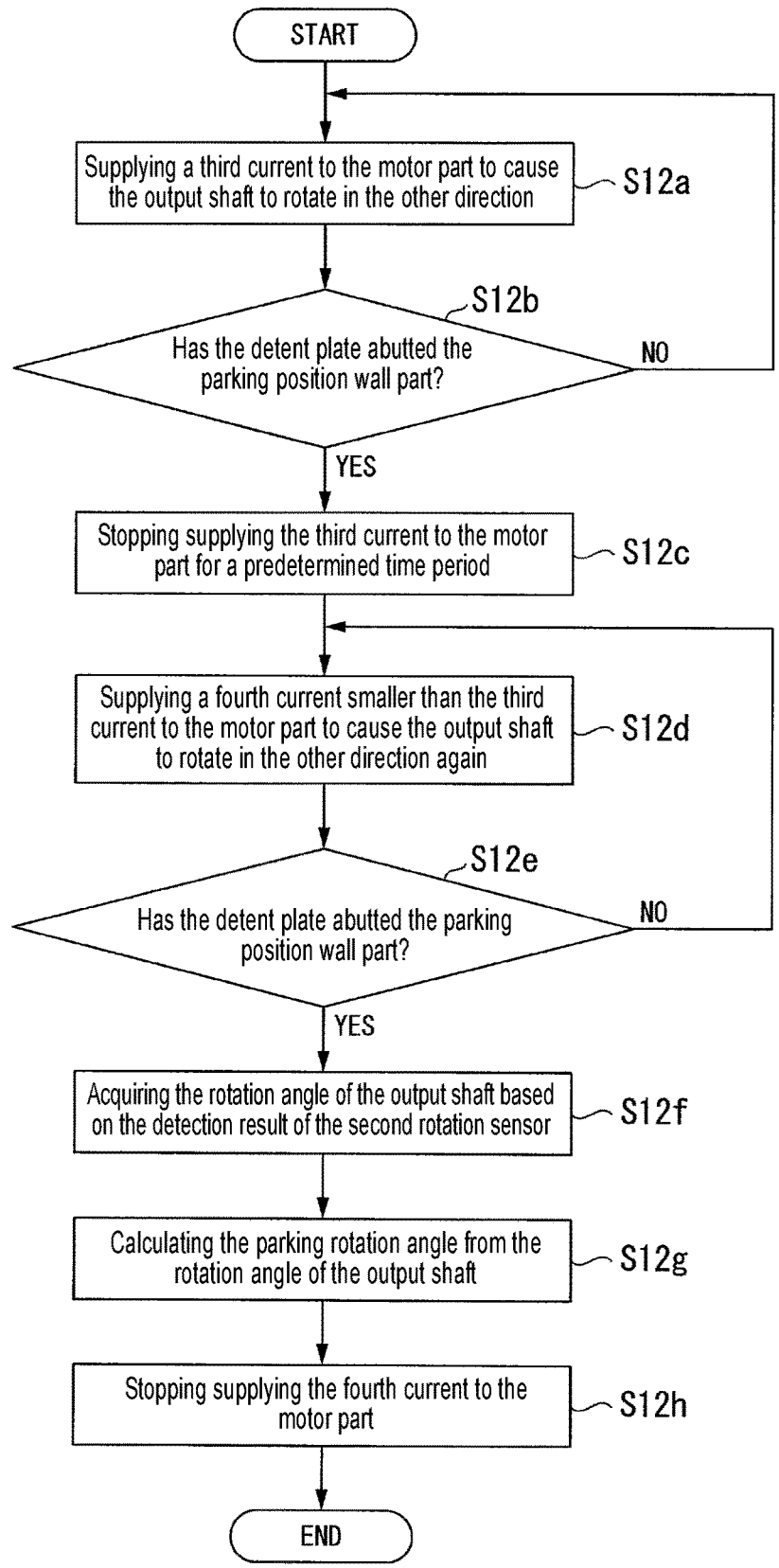
FIG. 6 is a flowchart showing an example of a procedure of a parking rotation angle acquisition control of the embodiment.

As shown in FIG. 4, in step S12, the control part 40 performs a parking rotation angle acquisition control for acquiring the target rotation angle of the output shaft 100 when the movable part 70a is moved from the non-parking position P1 to the parking position P2 as the parking rotation angle. In the parking rotation angle acquisition control of the embodiment, the control part 40 executes the procedure of steps S12a to S12h shown in FIG. 6. Further, in the embodiment, the parking rotation angle corresponds to a second rotation angle, and the parking rotation angle acquisition control corresponds to a second rotation angle acquisition control.

In step S12a, the control part 40 supplies a third current to the motor part 20 to cause the output shaft 100 to rotate in the other direction. In the embodiment, the other direction is a direction that rotates clockwise as viewed from the one front-rear-direction side (the +X side) with the central axis J1 as the center, and is a direction opposite to the direction pointed by the arrow θ showing the rotation angle of the output shaft 100 in FIG. 2. When the output shaft 100 rotates in the other direction, the detent plate 71 rotates clockwise as viewed from the one front-rear-direction side (the +X side) with the central axis J1 as the center, and the movable part 70a moves toward the one left-right-direction side (the +Y side). The absolute value of the third current is, for example, the same as the absolute value of the first current. Further, the absolute value of the third current may be different from the absolute value of the first current.

In step S12b, the control part 40 determines whether or not the detent plate 71 has abutted the parking position wall part 79b. Similar to step S11b described above, the control part 40 determines whether or not the detent plate 71 has abutted the parking position wall part 79b based on the detection result of the second rotation sensor 52.

When determining that the detent plate 71 has not abutted the parking position wall part 79b, the control part 40 continues supplying the third current to the motor part 20 and continues causing the output shaft 100 to rotate in the other direction. On the other hand, when determining that the detent plate 71 has abutted the parking position wall part 79b, the control part 40 performs step S12c. In step S12c, the control part 40 stops supplying the third current to the motor part 20 for a predetermined time period. The predetermined time period is, for example, about several seconds. The predetermined time period for stopping the supply of the third current in step S12c may be the same as or different from the predetermined time period for stopping the supply of the first current in step S11c.

In the case where the third current is supplied to the motor part 20 so that the detent plate 71 abuts the parking position wall part 79b, similar to the case where the first current is supplied to the motor part 20 so that the detent plate 71 abuts the non-parking position wall part 79a, for example, the output shaft 100 and the like elastically deform. Therefore, when the supply of the third current to the motor part 20 is stopped in step S12c, the elastically deformed part recovers the deformation, whereby the movable part 70a moves only in a direction from the parking position P2 to the non-parking position P1. As a result, the detent plate 71 is detached from the parking position wall part 79b. At this time, the inserted part 76b remains located in the inner part of the second concave part 71b.

In step S12d, the control part 40 supplies a fourth current smaller than the third current to the motor part 20 to cause the output shaft 100 to rotate in the other direction again. The value of the fourth current is small to the extent that the movable part 70a cannot sufficiently push up the leaf spring member 76 and the inserted part 76b cannot move over the convex part 71c provided between the first concave part 71a and the second concave part 71b. The value of the fourth current is a value that is small to the extent that the elastic deformation of at least a part of the movable part 70a and the output shaft 100 does not occur when the detent plate 71 has abutted the parking position wall part 79b. The absolute value of the fourth current is, for example, the same as the absolute value of the second current. Further, for example, the absolute value of the fourth current may be different from the absolute value of the second current.

In step S12e, the control part 40 determines whether or not the detent plate 71 has abutted the parking position wall part 79b. Similar to step S12b described above, the control part 40 determines whether or not the detent plate 71 has abutted the parking position wall part 79b based on the detection result of the second rotation sensor 52.

When determining that the detent plate 71 has not abutted the parking position wall part 79b, the control part 40 continues supplying the fourth current to the motor part 20 and continues causing the output shaft 100 to rotate in the other direction. On the other hand, when determining that the detent plate 71 has abutted the parking position wall part 79b, the control part 40 performs step S12f.

In step S12f, the control part 40 acquires the rotation angle of the output shaft 100 when the detent plate 71 has abutted the parking position wall part 79b based on the detection result of the second rotation sensor 52. That is, in the parking rotation angle acquisition control, the control part 40 acquires the rotation angle of the output shaft 100 when the movable part 70a has abutted the parking position wall part 79b.

In step S12g, the control part 40 calculates the parking rotation angle from the rotation angle of the output shaft 100 acquired in step S12f. That is, in the parking rotation angle acquisition control, the control part 40 calculates the parking rotation angle based on the rotation angle of the output shaft 100 when the movable part 70a has abutted the parking position wall part 79b as the value of the current is reduced.

Specifically, the control part 40 calculates, as the parking rotation angle, a rotation angle that is closer to the one circumferential-direction side (the +θ side) than the rotation angle of the output shaft 100 acquired based on the detection result of the second rotation sensor 52 by a second predetermined angle. That is, the parking rotation angle is the rotation angle of the output shaft 100 that is closer to the non-parking position P1 side (the −Y side and the +θ side) than when the movable part 70a abuts the parking position wall part 79b.

Similar to the first predetermined angle described above, the second predetermined angle is determined based on the estimated maximum error amount of the rotation angle of the output shaft 100 and the like. That is, the second predetermined angle is, for example, a value acquired by multiplying the estimated maximum error amount of the rotation angle of the output shaft 100 by a safety factor. The second predetermined angle is, for example, the same as the first predetermined angle. By calculating the parking rotation angle in this way, when the output shaft 100 is rotated with the parking rotation angle as the target rotation angle, even when the output shaft 100 is rotated to a position most deviated within a range estimated with respect to the parking rotation angle, the detent plate 71 can be suppressed from colliding with the parking position wall part 79b. When the rotation angle of the output shaft 100 is the parking rotation angle, the movable part 70a is located at the parking position P2, and the park lock gear 6 is in the locked state.

In step S12h, the control part 40 stops supplying the fourth current to the motor part 20. Thus, the parking rotation angle acquisition control of step S12 ends, and the parking rotation angle is acquired.

As shown in FIG. 4, in step S13, the control part 40 causes the output shaft 100 to rotate in the one direction (the +θ direction) with the target rotation angle set to the non-parking rotation angle acquired in step S11. In step S13, for example, similar to step S11a, the control part 40 supplies the first current to the motor part 20.

In step S14, the control part 40 determines whether or not the rotation angle of the output shaft 100 has become the non-parking rotation angle based on the second rotation sensor 52. When determining that the rotation angle of the output shaft 100 has not become the non-parking rotation angle, the control part 40 continues supplying the first current to the motor part 20 and continues causing the output shaft 100 to rotate in the one direction (the +θ direction). On the other hand, when determining that the rotation angle of the output shaft 100 has become the non-parking rotation angle, the control part 40 performs step S15. In step S15, the control part 40 stops driving the motor part 20.

Here, the non-parking rotation angle as described above is the rotation angle that is closer to the parking position P2 side (the +Y side and the −θ side) than when the movable part 70a abuts the non-parking position wall part 79a. Therefore, when the driving of the motor part 20 is stopped at the non-parking rotation angle, the detent plate 71 is located in front of the non-parking position wall part 79a and does not contact the non-parking position wall part 79a. However, after the driving of the motor part 20 is stopped, the movable part 70a simply moves due to inertia. As a result, the detent plate 71 contacts the non-parking position wall part 79a.

Further, in the case where the detent plate 71 moves due to inertia and contacts the non-parking position wall part 79a, the moving speed of the detent plate 71 is sufficiently small. Therefore, even if the detent plate 71 contacts the non-parking position wall part 79a, the parking switching mechanism 70 can be suppressed from being damaged.

Figure 7:
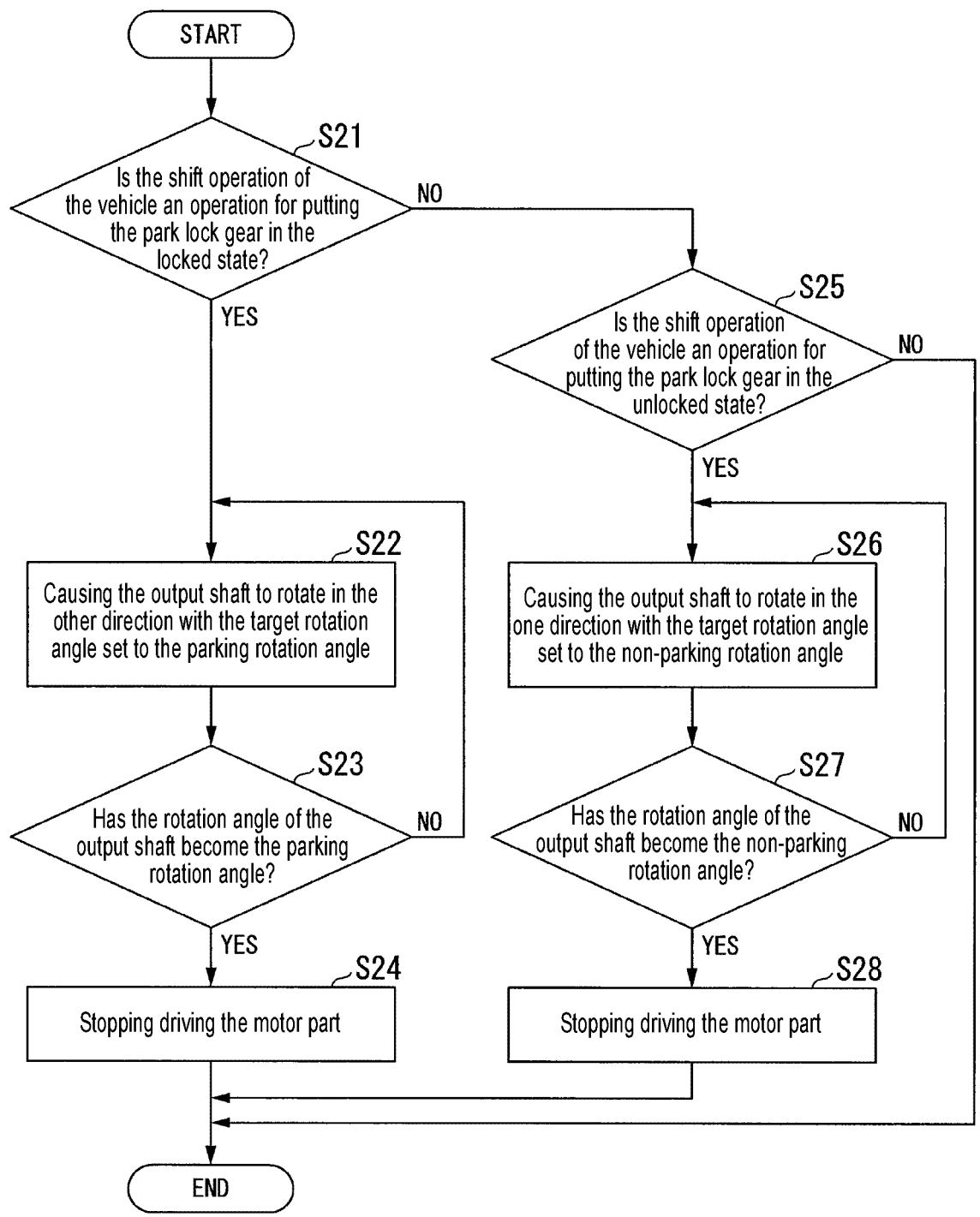
FIG. 7 is a flowchart showing an example of a switching procedure of a parking switching mechanism by the actuator of the embodiment.

As described above, the movable part 70a is located in the non-parking position P1, and the rotation angle learning control ends. The control part 40 performs the switching control of the parking switching mechanism 70 with the non-parking rotation angle and the parking rotation angle acquired by the rotation angle learning control described above. Specifically, in the embodiment, the control part 40 performs the switching control of the parking switching mechanism 70 according to the procedure of steps S21 to S28 shown in FIG. 7.

In step S21, the control part 40 determines whether or not the shift operation of the vehicle is an operation for putting the park lock gear 6 in the locked state based on the input movement command CS. When determining that the shift operation of the vehicle is the operation for putting the park lock gear 6 in the locked state, the control part 40 performs steps S22, S23 and S24. Further, when the shift operation of the vehicle is the operation for putting the park lock gear 6 in the locked state, the movable part 70a is located at the non-parking position P1 at the time of step S21.

In step S22, the control part 40 causes the output shaft 100 to rotate in the other direction (the −θ direction) with the target rotation angle set to the parking rotation angle. In step S22, for example, similar to step S12a, the control part 40 supplies the third current to the motor part 20.

In step S23, the control part 40 determines whether or not the rotation angle of the output shaft 100 has become the parking rotation angle based on the second rotation sensor 52. When determining that the rotation angle of the output shaft 100 has not become the parking rotation angle, the control part 40 continues supplying the third current to the motor part 20 and continues causing the output shaft 100 to rotate in the other direction (the −θ direction). On the other hand, when determining that the rotation angle of the output shaft 100 has become the parking rotation angle, the control part 40 performs step S24. In step S24, the control part 40 stops driving the motor part 20.

Here, the parking rotation angle as described above is the rotation angle that is closer to the non-parking position P1 side (the −Y side and the +θ side) than when the movable part 70a abuts the parking position wall part 79b. Therefore, when the driving of the motor part 20 is stopped at the parking rotation angle, the detent plate 71 is located in front of the parking position wall part 79b and does not contact the parking position wall part 79b. However, after the driving of the motor part 20 is stopped, the movable part 70a simply moves due to inertia. As a result, the detent plate 71 contacts the parking position wall part 79b.

Further, in the case where the detent plate 71 moves due to inertia and contacts the parking position wall part 79b, the moving speed of the detent plate 71 is sufficiently small. Therefore, even if the detent plate 71 contacts the parking position wall part 79b, the parking switching mechanism 70 can be suppressed from being damaged.

In step 21, when determining that the shift operation of the vehicle is not the operation for putting the park lock gear 6 in the locked state, the control part 40 performs steps S25. In step S25, the control part 40 determines whether or not the shift operation of the vehicle is an operation for putting the park lock gear 6 in the unlocked state based on the input movement command CS. When determining that the shift operation of the vehicle is the operation for putting the park lock gear 6 in the unlocked state, the control part 40 performs steps S26, S27 and S28. Further, when the shift operation of the vehicle is the operation for putting the park lock gear 6 in the unlocked state, the movable part 70a is located at the parking position P2 at the time of step S25.

In steps S26, S27 and S28, similar to steps S13, S14 and S15 described above, the control part 40 causes the output shaft 100 to rotate to the non-parking rotation angle and puts the park lock gear 6 in the unlocked state. Step S26 is the same as step S13. Step S27 is the same as step S14. Step S28 is the same as step S15.

In step 25, when determining that the shift operation of the vehicle is not the operation for putting the park lock gear 6 in the unlocked state, the control part 40 does not perform the driving of the parking switching mechanism 70. Further, in this case, the shift operation of the vehicle is an operation for switching the vehicle gear while the park lock gear 6 remains in the unlocked state. The operation for switching the vehicle gear while the park lock gear 6 remains in the unlocked state is, for example, an operation for switching vehicle gear between any two states of drive, neutral, and reverse.

According to the embodiment, in the non-parking rotation angle acquisition control, the control part 40 causes the output shaft 100 to rotate so that the movable part 70a abuts the non-parking position wall part 79a, and acquires the rotation angle of the output shaft 100 when the movable part 70a has abutted the non-parking position wall part 79a based on the detection result of the second rotation sensor 52. Then, in the non-parking rotation angle acquisition control, the control part 40 calculates the non-parking rotation angle based on the rotation angle of the output shaft 100 that has been acquired. Therefore, the rotation angle of the output shaft 100 that can suitably make the movable part 70a approach the non-parking position wall part 79a within the range where the movable part 70a does not collide with the non-parking position wall part 79a can be acquired as the non-parking rotation angle. In this way, even if an assembly error and the like occur in the parking switching mechanism 70 and the like, when the park lock gear 6 is put into the unlocked state, the movement of the movable part 70a can be suppressed from being insufficient while the movable part 70a can be suppressed from colliding with the non-parking position wall part 79a. Therefore, the switching accuracy of the parking switching mechanism 70 by the actuator 10 can be improved. That is, the accuracy of displacing an object by the actuator 10 can be improved. Moreover, since the movable part 70a can be suppressed from colliding with the non-parking position wall part 79a, the parking switching mechanism 70 can be suppressed from being damaged.

Further, as described above, when the value of the current supplied to the motor part 20 is relatively large when the movable part 70a abuts the non-parking position wall part 79a, at least a part of the movable part 70a and the output shaft 100 may elastically deform. In this case, since a deviation occurs in the rotation angle of the output shaft 100 when the movable part 70a abuts the non-parking position wall part 79a, a deviation also occurs in the non-parking rotation angle to be calculated. Therefore, the switching accuracy of the parking switching mechanism 70 by the actuator 10 may be difficult to improve.

In this regard, according to the embodiment, in the non-parking rotation angle acquisition control, the control part 40 makes the movable part 70a abut the non-parking position wall part 79a for at least two times, and in at least one time when the movable part 70a abuts the non-parking position wall part 79a for the second or subsequent time, the value of the current supplied to the motor part 20 is made smaller than the value of the current supplied to the motor part 20 when the movable part 70a abuts the non-parking position wall part 79a for the first time. Therefore, even if the output shaft 100 and the like elastically deform in the first time of the abutment of the movable part 70a, by reducing the current supplied to the motor part 20 in at least one time in the second or subsequent time of the abutment of the movable part 70a, the output shaft 100 and the like can be suppressed from deforming and the movable part 70a can abut the non-parking position wall part 79a. In this way, a deviation can be suppressed from occurring in the rotation angle of the output shaft 100 when the movable part 70a abuts the non-parking position wall part 79a, and a deviation can be suppressed from occurring in the non-parking rotation angle to be calculated. Therefore, the switching accuracy of the parking switching mechanism 70 by the actuator 10 can be suitably improved.

Specifically, in the embodiment, when the movable part 70a moves from the parking position P2 to the non-parking position P1, since it is necessary for the convex part 71c provided on the detent plate 71 to push up the leaf spring member 76, it is necessary for the rotational torque for moving the movable part 70a to be relatively large. Therefore, by driving the motor part 20 with a relatively large current in the first time of the abutment, the leaf spring member 76 can be easily pushed up by the convex part 71c. In this way, by the first time of the abutment, the inserted part 76b of the leaf spring member 76 changes from the state of being inserted into the second concave part 71b to the state of being inserted into the first concave part 71a. In addition, in a state where the inserted part 76b is inserted into the first concave part 71a, since the detent plate 71 can abut the non-parking position wall part 79a without pushing up the leaf spring member 76, in the second or subsequent time of the abutment, the current supplied to the motor part 20 can be relatively small. Therefore, elastic deformation can be suppressed from occurring in the output shaft 100 and the like and the movable part 70a can abut the non-parking position wall part 79a.

Further, according to the embodiment, in the non-parking rotation angle acquisition control, the control part 40 calculates the non-parking rotation angle based on the rotation angle of the output shaft 100 when the movable part 70a has abutted the non-parking position wall part 79a as the value of the current is reduced. Specifically, in the embodiment, the non-parking rotation angle is calculated based on the rotation angle of the output shaft 100 when the movable part 70a has abutted the non-parking position wall part 79a for the second time when the second current smaller than the first current is supplied to the motor part 20. In this way, the non-parking rotation angle can be suitably calculated.

Further, according to the embodiment, in the non-parking rotation angle acquisition control, the control part 40 stops supplying the current to the motor part 20 for a predetermined time period after the movable part 70a has abutted the non-parking position wall part 79a for the first time. Therefore, in the case where the output shaft 100 and the like have elastically deformed in the first time of the abutment, the elastically deformed output shaft 100 and the like can recover the deformation in the predetermined time period when the supply of the current to the motor part 20 is stopped. In this way, the second and subsequent times of the abutment can be performed in a state where the elastic deformation occurring in the output shaft 100 and the like have been eliminated. Therefore, the rotation angle of the output shaft 100 when the movable part 70a has abutted the non-parking position wall part 79a can be acquired with higher accuracy, and the non-parking rotation angle can be calculated with higher accuracy.

Further, according to the embodiment, in the parking rotation angle acquisition control, the control part 40 causes the output shaft 100 to rotate so that the movable part 70a abuts the parking position wall part 79b, and acquires the rotation angle of the output shaft 100 when the movable part 70a has abutted the parking position wall part 79b based on the detection result of the second rotation sensor 52. Then, in the parking rotation angle acquisition control, the control part 40 calculates the parking rotation angle based on the rotation angle of the output shaft 100 that has been acquired. Therefore, the rotation angle of the output shaft 100 that can suitably make the movable part 70a approach the parking position wall part 79b within the range where the movable part 70a does not collide with the parking position wall part 79b can be acquired as the parking rotation angle. In this way, even if an assembly error and the like occur in the parking switching mechanism 70 and the like, when the park lock gear 6 is put into the locked state, the movement of the movable part 70a can be suppressed from being insufficient while the movable part 70a can be suppressed from colliding with the parking position wall part 79b. Therefore, the switching accuracy of the parking switching mechanism 70 by the actuator 10 can be improved. Moreover, since the movable part 70a can be suppressed from colliding with the parking position wall part 79b, the parking switching mechanism 70 can be suppressed from being damaged.

In addition, according to the embodiment, in the parking rotation angle acquisition control, the control part 40 makes the movable part 70a abut the parking position wall part 79b for at least two times, and in at least one time when the movable part 70a abuts the parking position wall part 79b for the second or subsequent time, the value of the current supplied to the motor part 20 is made smaller than the value of the current supplied to the motor part 20 when the movable part 70a abuts the parking position wall part 79b for the first time. Therefore, similar to the non-parking rotation angle acquisition control described above, a deviation can be suppressed from occurring in the rotation angle of the output shaft 100 when the movable part 70a abuts the parking position wall part 79b, and a deviation can be suppressed from occurring in the parking rotation angle to be calculated. Therefore, the switching accuracy of the parking switching mechanism 70 by the actuator 10 can be suitably improved.

Further, according to the embodiment, in the parking rotation angle acquisition control, the control part 40 calculates the parking rotation angle based on the rotation angle of the output shaft 100 when the movable part 70a has abutted the parking position wall part 79b as the value of the current is reduced. Therefore, the parking rotation angle can be suitably calculated.

Further, according to the embodiment, in the parking rotation angle acquisition control, the control part 40 stops supplying the current to the motor part 20 for a predetermined time period after the movable part 70a has abutted the parking position wall part 79b for the first time. Therefore, similar to the non-parking rotation angle acquisition control described above, the rotation angle of the output shaft 100 when the movable part 70a has abutted the parking position wall part 79b can be acquired with higher accuracy, and the parking rotation angle can be calculated with higher accuracy.

The disclosure is not limited to the above-described embodiment, and other configurations and methods can be adopted. The timing at which the rotation angle learning control described above is performed is not particularly limited as long as it is performed for at least one time before switching the parking switching mechanism for the first time. The rotation angle learning control may be performed regularly. Further, in the rotation angle learning control of the above embodiment, it is configured that the control part 40 acquires the parking rotation angle in step S12 after acquiring the non-parking rotation angle in step S11, but the disclosure is not limited thereto. In the rotation angle learning control, the control part 40 may acquire the non-parking rotation angle after acquiring the parking rotation angle. That is, in the above embodiment, in the rotation angle learning control, the control part 40 may perform step S11 after performing step S12. In this case, the control part 40 may stop driving the motor part 20 without performing steps S13 and S14, and instead of performing steps S13 and S14, the control part 40 may set the rotation angle of the output shaft 100 to the parking rotation angle and then stop driving the motor part 20.

In the rotation angle learning control, the rotation angle to be acquired may be only one of the non-parking rotation angle and the parking rotation angle. In the case where only the parking rotation angle is acquired, the parking rotation angle corresponds to the first rotation angle. Further, in this case, the parking position corresponds to the first position, and the parking position wall part corresponds to the first wall part, and the parking rotation angle acquisition control corresponds to the first rotation angle acquisition control.

The number of times for which the movable part abuts each wall part when each rotation angle is acquired is not particularly limited as long as it is at least one time. The control part may acquire each rotation angle by making the movable part abut each wall part for three or more times. In addition, in the case where the movable part abuts each wall part for a plurality of times, the control part may calculate each rotation angle by using each of the rotation angles of the output shaft in the plurality of times of abutments, or the control part may calculate each rotation angle by using a part of the rotation angles of the output shaft in the plurality of times of abutments. For example, in the case where the movable part abuts the non-parking position wall part for three times, the control part may reduce the current supplied to the motor part in the second time and the third time, and calculate the non-parking rotation angle based on the average value of the rotation angles of the output shaft in the second time and the third time.

The parking switching mechanism is not particularly limited as long as it includes the movable part and at least one of the non-parking position wall part and the parking position wall part. The first rotation sensor that can detect the rotation of the motor part and the second rotation sensor that can detect the rotation of the output shaft may be sensors other than magnetic sensors. The first rotation sensor and the second rotation sensor may be, for example, optical sensors.

The object that is displaced and driven by the actuator is not particularly limited as long as it is an object that is displaced and driven based on a vehicle operation. The object may be, for example, a shift-by-wire driving device or a switching mechanism that switches between two-wheel drive and four-wheel drive of a vehicle.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An actuator which displaces and drives an object based on a vehicle operation, comprising:
   a motor part;
   a decelerator part which is connected to the motor part;
   a control part which controls the motor part;
   a first rotation sensor which is able to detect rotation of the motor part; and
   a second rotation sensor which is able to detect rotation of an output shaft connected to the decelerator part,
   wherein the object comprises:
      a movable part which is moved between a first position and a second position by the output shaft; and
      a first wall part which is able to abut the movable part being at the first position,
   the control part performs a first rotation angle acquisition control for acquiring a target rotation angle of the output shaft, when the movable part is moved from the second position to the first position, as a first rotation angle,
   the first rotation angle is a rotation angle of the output shaft that is closer to the second position side than when the movable part abuts the first wall part, and
   in the first rotation angle acquisition control, the control part
      causes the output shaft to rotate so that the movable part abuts the first wall part,
      acquires a rotation angle of the output shaft when the movable part has abutted the first wall part based on a detection result of the second rotation sensor,
      calculates the first rotation angle based on the rotation angle of the output shaft that has been acquired, and
      makes the movable part to abut the first wall part for at least two times, and in at least one time when the movable part abuts the first wall part for the second or subsequent time, a value of a current supplied to the motor part is made smaller than a value of a current supplied to the motor part when the movable part abuts the first wall part for the first time.

2. The actuator according to claim 1, wherein in the first rotation angle acquisition control, the control part calculates the first rotation angle based on the rotation angle of the output shaft when the movable part has abutted the first wall part as the value of the current is reduced.

3. The actuator according to claim 1, wherein in the first rotation angle acquisition control, the control part stops supplying a current to the motor part for a predetermined time period after the movable part has abutted the first wall part for the first time.

4. The actuator according to claim 1, wherein the object comprises a second wall part which is able to abut the movable part being at the second position,
   the control part performs a second rotation angle acquisition control for acquiring a target rotation angle of the output shaft, when the movable part is moved from the first position to the second position, as a second rotation angle,
   the second rotation angle is a rotation angle of the output shaft that is closer to the first position side than when the movable part abuts the second wall part, and
   in the second rotation angle acquisition control, the control part
      causes the output shaft to rotate so that the movable part abuts the second wall part,
      acquires a rotation angle of the output shaft when the movable part has abutted the second wall part based on the second rotation sensor, and calculates the second rotation angle based on the rotation angle of the output shaft that has been acquired.

5. The actuator according to claim 4, wherein in the second rotation angle acquisition control, the control part makes the movable part to abut the second wall part for at least two times, and in at least one time when the movable part abuts the second wall part for the second or subsequent time, a value of a current supplied to the motor part is made smaller than a value of a current supplied to the motor part when the movable part abuts the second wall part for the first time.

6. The actuator according to claim 5, wherein in the second rotation angle acquisition control, the control part calculates the second rotation angle based on the rotation angle of the output shaft when the movable part has abutted the second wall part as the value of the current is reduced.

7. The actuator according to claim 5, wherein in the second rotation angle acquisition control, the control part stops supplying a current to the motor part for a predetermined time period after the movable part has abutted the second wall part for the first time.

8. The actuator according to claim 1, wherein the object is a parking switching mechanism which is switched based on a shift operation of a vehicle.

9. An actuator device, comprising:
the actuator according to claim 1;
the output shaft; and
the object.

10. The actuator device according to claim 9, wherein the movable part comprises a detent plate which is moved by the output shaft,
the detent plate comprises a first concave part and a second concave part which are recessed on one side in an intersection direction that intersects a moving direction in which the movable part moves,
the first concave part and the second concave part are disposed side by side in the moving direction,
the object comprises an elastic member having an inserted part to be inserted into the first concave part or the second concave part,
the inserted part
is inserted into the first concave part and hooked with respect to an inner side surface of the first concave part in the moving direction when the movable part is located at the first position, and
is inserted into the second concave part and hooked with respect to an inner side surface of the second concave part in the moving direction when the movable part is located at the second position, and
the elastic member is pushed by a convex part provided between the first concave part and the second concave part and elastically deforms when the movable part moves between the first position and the second position.

\* \* \* \* \*